United States Patent
Bailey et al.

(10) Patent No.: US 9,625,974 B2
(45) Date of Patent: Apr. 18, 2017

(54) GLOBAL THROTTLING OF COMPUTING NODES IN A MODULAR, RACK-CONFIGURED INFORMATION HANDLING SYSTEM

(71) Applicant: DELL, INC., Round Rock, TX (US)

(72) Inventors: Edmond Bailey, Cedar Park, TX (US); John R. Stuewe, Round Rock, TX (US); Paul W. Vancil, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 258 days.

(21) Appl. No.: 14/139,739

(22) Filed: Dec. 23, 2013

(65) Prior Publication Data

US 2015/0177813 A1    Jun. 25, 2015

(51) Int. Cl.
| | |
|---|---|
| *G06F 1/32* | (2006.01) |
| *G06F 1/00* | (2006.01) |
| *G06F 1/20* | (2006.01) |
| *G06F 1/28* | (2006.01) |

(52) U.S. Cl.
CPC ............ *G06F 1/3234* (2013.01); *G06F 1/206* (2013.01); *G06F 1/28* (2013.01); *G06F 1/3206* (2013.01); *Y02B 60/1275* (2013.01)

(58) Field of Classification Search
CPC ........ G06F 1/3234; G06F 1/3206; G06F 1/30; G06F 1/324; G06F 1/3287; G06F 1/3293; G06F 1/3296
See application file for complete search history.

(56) References Cited

U.S. PATENT DOCUMENTS

| | | | | |
|---|---|---|---|---|
| 7,055,044 | B2 * | 5/2006 | Barr ....................... | G06F 1/206 713/300 |
| 7,716,498 | B1 * | 5/2010 | Connor, Jr. ........... | G06F 1/3221 713/300 |
| 8,006,112 | B2 * | 8/2011 | Munjal .................... | G06F 1/30 713/300 |
| 8,386,812 | B2 * | 2/2013 | Rembert ........... | H04L 12/40045 713/300 |
| 2006/0242453 | A1 * | 10/2006 | Kumar ................ | G06F 11/0793 714/4.1 |

(Continued)

*Primary Examiner* — Zahid Choudhury
(74) *Attorney, Agent, or Firm* — Isidore PLLC

(57) ABSTRACT

A computer-implemented method enables global throttling of processing nodes in a rack-configured information handling system (RIHS). A rack-level management controller receives power-usage data and operating parameters associated with processing nodes within separately-controlled blocks of the RIHS. A power subsystem of the RIHS regulates an amount of power supplied to the processing nodes of the RIHS based on the power-usage data and operating parameters for the processing nodes and a total amount of available power for distribution within the RIHS. In response to detecting a condition that reduces the total amount of available power for distribution within the IHS, the management controller autonomously initiates global throttling of the processing nodes within the IHS to reduce power consumption by at least one of the processing nodes. The global throttling is completed via a signal transfer over a select Ethernet cable wire to connected block controllers that control the processing nodes.

29 Claims, 10 Drawing Sheets

(56) References Cited

U.S. PATENT DOCUMENTS

| | | | | |
|---|---|---|---|---|
| 2006/0253633 A1* | 11/2006 | Brundridge | ............ | G06F 13/409 710/104 |
| 2007/0260897 A1* | 11/2007 | Cochran | ................. | G06F 1/263 713/300 |
| 2008/0159413 A1* | 7/2008 | Mehan | ................... | G06F 1/3209 375/257 |
| 2011/0264935 A1* | 10/2011 | Shetty | ................... | G06F 1/3203 713/320 |
| 2012/0116590 A1* | 5/2012 | Florez-Larrahondo | . | G06F 1/206 700/275 |
| 2012/0204051 A1* | 8/2012 | Murakami | ............ | G06F 9/5088 713/324 |
| 2012/0324263 A1* | 12/2012 | Hanson | ................. | G06F 9/5061 713/320 |
| 2013/0226362 A1* | 8/2013 | Jagadishprasad | ..... | G06F 9/5094 700/297 |
| 2014/0195657 A1* | 7/2014 | Bhatia | ................. | H04L 43/0817 709/223 |
| 2014/0344431 A1* | 11/2014 | Hsu | ....................... | H04L 41/044 709/223 |
| 2015/0019711 A1* | 1/2015 | Zhang | ................. | H04L 43/0817 709/224 |

\* cited by examiner

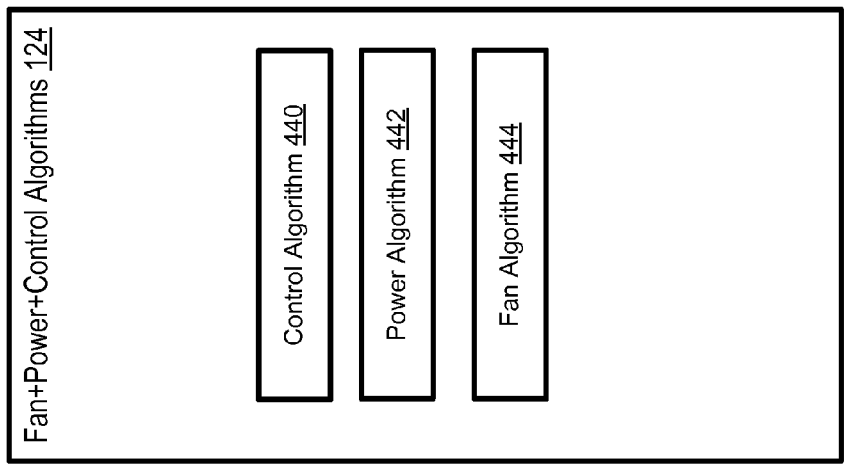
FIG. 4C
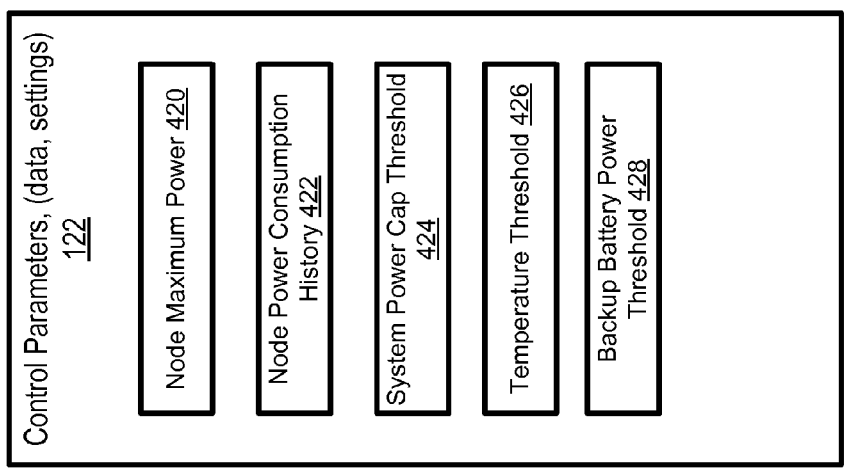
FIG. 4B
FIG. 4A

GLOBAL THROTTLING OF COMPUTING NODES IN A MODULAR, RACK-CONFIGURED INFORMATION HANDLING SYSTEM

BACKGROUND

1. Technical Field

The present disclosure generally relates information handling systems and in particular to throttling of processing nodes in a rack-configured information handling system to reduce power consumption.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Providing power management and cooling to an information handling system is important to prevent loss of data and to maintain system reliability. During operation of an information handling system, events can occur that interrupt or reduce the amount of incoming AC power to the information handling system or the amount of available power from power supplies that deliver electrical power to the information handling system. It is desirable for the information handling system to be able to seamlessly manage both increases and decreases in power demands from the components of the information handling system and to be able to manage interruptions in the delivery of power to the information handling system.

BRIEF SUMMARY

Disclosed are a computer-implemented method, a rack-level power control system and an information handling system that enables global throttling of processing nodes in a modular, rack-based information handling system.

According to one embodiment, the method comprises receiving, at a rack-level management controller, power-usage data and settings associated with one or more processing nodes within one or more separately-controlled blocks of the information handling system (IHS). A power subsystem of the IHS is triggered to regulate an amount of power supplied to one or more of the processing nodes of the information handling system based on the power-usage data and settings information received for the one or more processing nodes and a total amount of available power for distribution within the IHS. In response to detecting a condition that reduces the total amount of available system power for distribution within the IHS, the management controller autonomously initiates global throttling of power allocation within the IHS to reduce power consumption by at least one of the processing nodes via an associated block controller.

According to another embodiment, a rack-level power control system comprises a rack-level management controller having a processor. A memory is coupled to the processor via a system interconnect. A power subsystem is communicatively coupled to the rack-level management controller, and a cooling subsystem is communicatively coupled to the rack-level management controller. One or more blocks are communicatively coupled to the rack-level management controller. The blocks are controlled by at least one block controller that is communicatively coupled to the rack-level management controller, and each of the blocks has one or more processing nodes. An Ethernet cable is connected between the rack-level management controller and at least one of the block controllers. At least one of the wires in the Ethernet cable is allocated as a global throttle wire to provide communication of a global throttle power reduction (GTPR) signal from the rack-level management controller to at least one of the block controllers. The block controllers in turn forward the GTPR signal to at least one of the nodes managed by that block controller, triggering an immediate reduction in power usage by the processing nodes upon receipt of the GTPR signal.

Also disclosed is an information handling system (IHS) that comprises one or more blocks. The blocks are managed by at least one block controller, and each of the blocks has one or more processing nodes. A rack-level management controller is communicatively coupled to at least the block controller. The rack-level management controller includes a processor and a memory that is coupled to the processor via a system interconnect. A power subsystem is communicatively coupled to the rack-level management controller. A cooling subsystem is also communicatively coupled to the rack-level management controller. An Ethernet cable is connected between the rack-level management controller and at least one of the block controllers. At least one of the wires in the Ethernet cable is allocated as a global throttle wire to provide communication of a GTPR signal from the rack-level management controller to at least one of the block controllers. The block controllers in turn forward the GTPR to at least one of the nodes, triggering an immediate reduction in power usage by the processing nodes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements.

Embodiments incorporating teachings of the present disclosure are shown and described with respect to the figures presented herein, in which:

FIG. 4A is a block diagram illustrating contents of the management controller memory, in accordance with one embodiment;

FIG. 4B is a block diagram illustrating contents of the stored control parameters, in accordance with one embodiment;

FIG. 4C is a block diagram illustrating contents of the stored fan, power and control algorithms, in accordance with one embodiment;

DETAILED DESCRIPTION

Figure 1:
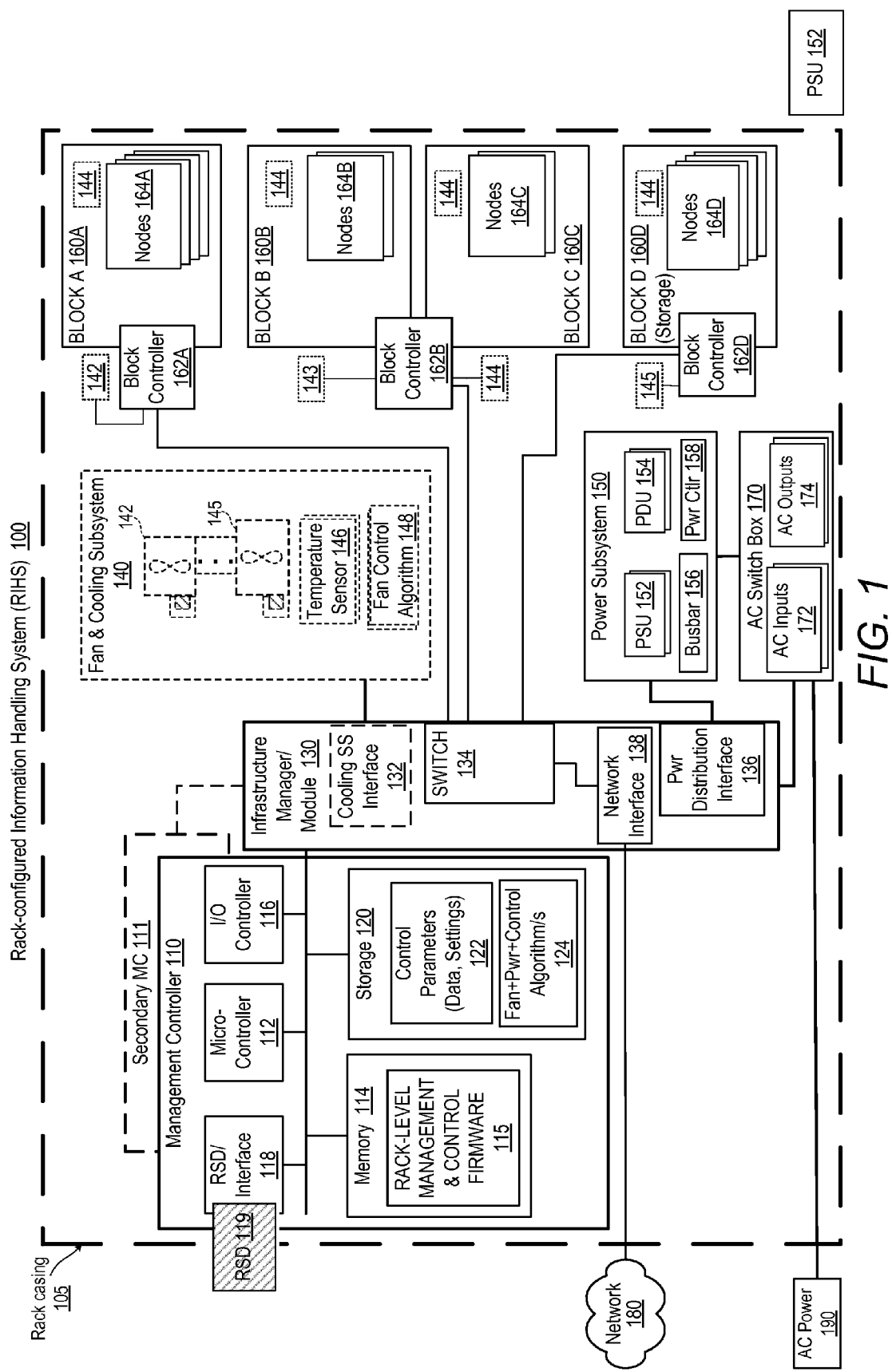
FIG. 1 is a block diagram illustration of an example modular, scalable and expandable (MSE) rack-based information handling system, according to one or more embodiments.

The illustrative embodiments provide a power control system, an information handling system (IHS) and a method performed within the information handling system that enables rack-level power control of processing nodes in a modular, rack-configured information handling system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Further, those of ordinary skill in the art will appreciate that the hardware components and basic configuration depicted in the various figures (e.g., FIG. 1) and described herein may vary. For example, the illustrative components within IHS 100 (FIG. 1) are not intended to be exhaustive, but rather are representative to highlight components that can be utilized to implement various aspects of the present disclosure. For example, other devices/components/modules may be used in addition to or in place of the hardware and software modules depicted. The depicted examples do not convey or imply any architectural or other limitations with respect to the presently described embodiments and/or the general disclosure.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, there is illustrated a two-dimensional block diagram of an example rack-based IHS 100 configured within a modular, expandable rack with modular configuration of various functional components inserted therein. As a two-dimensional image, certain of the presented components are shown in different orientations relative to each other for simplicity in describing the connectively of the components. For example, while certain components are shown separate from the power subsystem, in actual implementation, these components can be located on or within a power bay housing several of the components of the power subsystem. Similarly, while the power subsystem is shown with specific components within a single block, these components are not necessarily contained in a unitary structure. For example, the bus bar can be modularly extended along the entire vertical run of the rack with only one sub-section in direct connection with or located within or proximate to the actual power bay. For purposes of the disclosure, all general references to an information handling system shall refer to the MSE rack-based IHS 100, while references to actual processing nodes within the IHS 100 are understood to refer to chassis-level processing nodes or other IT gear that can be located on physical sleds within the various blocks defined within the rack. It is further appreciated that within the MSE rack-based IHS 100 can be multiple, separate domains or computing systems that operate independent of each other and can be assigned to different independent customers and/or users. Even when configured as separate computing systems, however, the rack-based IHS provides rack-level power management and control of these systems as a unitary IHS. The level of detail of the actual use of the processing nodes within the general rack-level IHS 100 is not relevant to the descriptions provided herein and are specifically omitted.

As presented in FIG. 1, IHS 100 comprises rack casing 105, which can comprise one or more panels of sheet metal or other material interconnected to form a three dimensional volume generally referred to in the industry as a rack. The various components are communicatively connected to one or more other components via power and communication cables, which are generally represented by the connecting lines of FIG. 1. IHS 100 comprises a hierarchical arrangement of multiple management modules, along with power and cooling components, and functional processing components or IT gear located within end nodes. At the rack level, IHS 100 includes management controller (MC) 110 communicatively connected to infrastructure manager/module (IM) 130. MC 110 includes a microcontroller 112 (also generally referred to as a processor) which is coupled via an internal bus to memory 114, I/O interface controller 116, removable storage device (RSD) interface 118 and storage 120. Memory 114 can be flash or other form of memory.

Illustrated within memory 114 is rack-level power management and control (RPMC or PMC) firmware 115, which is inclusive of the firmware that controls the operation of MC 110 in communicating with and managing the down-stream components (i.e., blocks and processing nodes, etc.) of IHS 100. I/O interface controller 116 provides connection points and hardware and firmware components that allow for user interfacing with the MC 110 via one or more connected I/O devices, such as a keyboard, a mouse, and a monitor. I/O interface controller 116 enables a user to enter commands via, for example, a command line interface (CLI), and to view status information of IHS 100. I/O interface controller 116 also enables the setting of operating parameters for IHS 100, among other supported user inputs.

RSD interface 118 enables insertion or connection of a RSD 119, such as an SD card containing pre-programmable operating firmware for IHS 100. In at least one embodiment, the RSD 119 stores a copy of the operating parameters of IHS 100 and the RDS 119 can be utilized to reboot the IHS 100 to its operating state following a system failure or maintenance shutdown. Storage 120 can be any form of persistent storage and can include different types of data and operating parameters (settings) 122 utilized for functional operation of IHS 100. Among the stored content within storage 120 can also be algorithms 124 for fan and/or power and/or control. In one or more embodiments, IHS 100 can optionally include at least one other MC, illustrated as secondary MC 111, to provide a redundant configuration of MCs 110, 111, which, in one embodiment, are both simultaneously active and functioning. With this embodiment, the redundant configuration and parallel operation of MCs 110/111 enables IHS 100 to continue operating following a failure of either of the MCs 110/111 or in the event one of the MCs 110/111 has to be taken offline for maintenance.

Infrastructure manager 130 includes cooling subsystem interface 132, Ethernet switch 134, power distribution interface 136 and network interface 138. Network interface 138 enables IHS 100 and specifically the components within IHS 100 to connect to and communicate with or via an external network 180.

In addition to the above-described MC 110 and IM 130, IHS 100 further comprises fan and cooling subsystem 140, power subsystem 150, and a plurality of blocks 160, individually labeled as blocks A-D 160A-160D. In one implementation, each block 160 has an associated block controller (BC) 162. Cooling subsystem 140 includes a plurality of fan modules of which a first fan module 142 and a second fan module 145 are shown. These fan modules 142, 145 are located within a respective fan bay (not shown) and can be different sizes and provide different numbers of fans per module. Also included within cooling subsystem 140 is a plurality of temperature sensors 146, which are further shown distributed within or associated with specific blocks 160. Cooling subsystem of IHS 100 further includes some design features of rack casing 105, such as perforations for air flow and other design features not expanded upon within the present description. Each fan module 142-145 is located behind (or in the air flow path of) a specific block 160 and the fan module 142-145 is communicatively coupled to and controlled by the block controller 162 associated with that block 160. Within each block 160 is at least one, and likely a plurality of processing nodes 164. As one aspect of the disclosure, the number of nodes that can be placed within each block and/or supported by a single block controller can vary up to a maximum number (e.g., 16) based on the block dimension relative to the size and configuration of each processing node. Additionally, as provided by block D 160D, one or more of the blocks can be utilized to provide rack-storage of storage devices. Also, as shown with blocks B 160B and C 160C, a single block controller 162B can be assigned to control multiple blocks, when the number of processing nodes within an individual block does not exceed the pre-established BC threshold. In at least one implementation, the BC threshold can be set to 16 nodes. Each node controlled by a respective BC 162 is communicatively coupled to the BC 162 via one or more cables (not shown).

Switch 134 enables MC 110 to communicate with block controllers 162 via a network of Ethernet cables 170. Specifically, according to at least one embodiment, MC 110 provides certain control and/or management signals to BCs 162 via one or more select wires within the Ethernet cables 170, which select wires are one or more of the additional wires within the Ethernet cable that are not utilized for general system and network communication.

Power subsystem 150 generally includes a plurality of power supply units (PSUs) 152, one or more power distribution units 154, and a modular busbar 156. Power subsystem 150 also includes a source of external power, assumed to be AC power 190. Each of the individual nodes and other components within IHS 100 that require power are either directly coupled to modular busbar 156 or coupled via power cables to PDUs to obtain power. As one aspect of power distribution within IHS 100, MC 110 can monitor power consumption across the IHS 100 as well as the amount of available power provided by the functional PSUs 152 and MC 110 can trigger changes in power consumption at the block level and ultimately at the (processing) node level based on changes in the amount of available power and other factors. Control of the power subsystem 150 can, in one embodiment, be provided by a separate power controller 158, separate from MC 110. As further illustrated, one additional aspect of the power system for the MSE rack-based IHS 100 provides for the inclusion of AC switch box 170. AC switch box 170 is communicatively coupled to both IM 130 and power subsystem 150. AC Switch 170 includes a plurality of AC inputs 172 and a plurality of AC outputs 174 that are utilized to supply power to the PSUs, and other functional components of MSER IHS 100 that require AC power.

Other features and functionality of IHS 100 will be described in greater detail hereafter with reference to one or more of the following figures.

Figure 2:
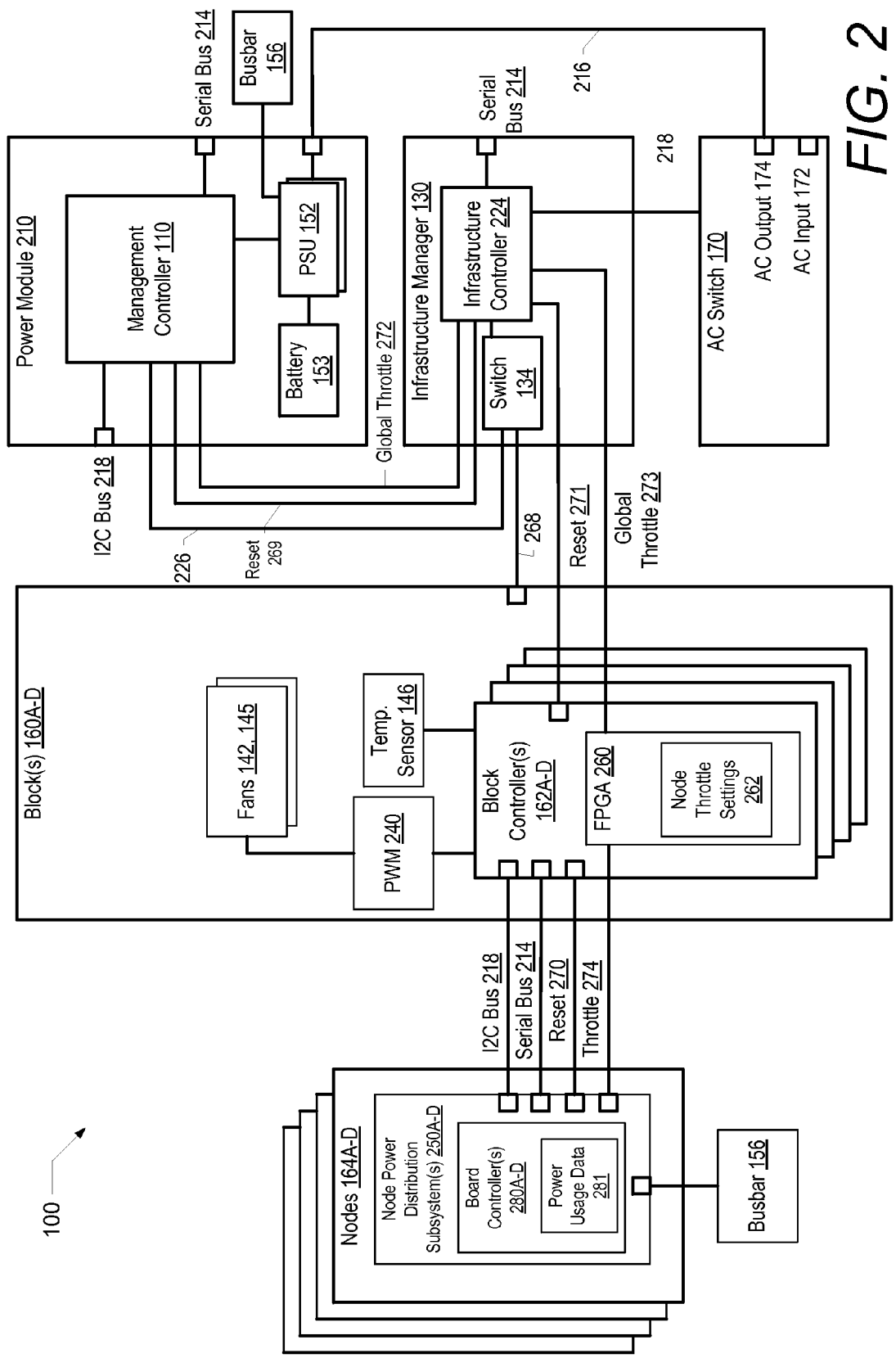
FIG. 2 is a block diagram illustrating the connectivity of components within the rack-based information handling system to implement global throttling of power to reduce power consumption by at least one of the nodes via an associated block controller, in accordance with one embodiment.

FIG. 2 illustrates further details of the connectivity of functional components within IHS 100 to implement a global throttling of power usage by the overall system by dynamically and/or autonomously triggering a reduction in power consumption by at least one of the nodes via a global throttle command signal sent from the MC 110 to an associated block controller 162. Referring specifically to FIG. 2, IHS 100 comprises a power module 210 that includes management controller (MC) 110 communicatively connected to one or more PSUs 152. MC 110 can receive power supply data and settings from PSUs 152. PSUs 152 are connected to an AC power terminal and cable 216 that provides a source of AC power to PSUs 152. A backup battery 153 is connected to PSUs 152 to supply backup system power in case of a loss of primary power (e.g., AC power 216) to IHS 100. An AC switch 170 supplies switched AC power to IHS 100. AC switch 170 has an AC input terminal 172 and an AC output 174. An AC power cable 216 is connected between and supplies AC power from AC switch 170 to PSUs 152.

MC 110 is communicatively connected to a serial bus 214 and an I2C bus 218. An Ethernet cable 226 is communicatively connected between MC 110 and switch 134 of infrastructure manager (IM) 130. Ethernet cable 226 comprises a plurality of individual wires (e.g., 8 wires) on which a different communication or signal can be routed. In one embodiment, Ethernet cable 226 can be a category 5 cable that has 8 wires arranged in 4 twisted pairs. Each of the twisted pairs has a signal wire and a ground wire that is wound around the signal wire. The ground wire reduces cross-talk noise and increases the transmission speed of electrical signals carried by Ethernet cable 226. In another embodiment, Ethernet cable 170 can contain more or less than 8 total wires. According to one aspect of the disclosure, at least one of the wires in the Ethernet cable 226 is assigned as a global throttle wire 272 to provide communication of a global throttle power reduction (GTPR) signal from the rack-level management controller 110 to the IM controller 224. In addition, in one or more embodiment and in accordance with another aspect of the disclosure, at least one other wire in the Ethernet cable 226 is assigned as a global reset wire 269 to allow for communication of a reset signal from the rack-level management controller 110 to the IM controller 224.

Infrastructure manager 130 comprises a switch 134 that is communicatively connected to IM controller 224. IM controller 224 is communicatively connected to an AC switch 170 and to a serial bus 214. Another set of Ethernet cables 268 are communicatively connected between IM controller 224 and each of block controller(s) 160A-D. Ethernet cables 268 each comprise a plurality of individual wires (e.g., 8 wires) on which a different communication or signal can be routed. In one embodiment, Ethernet cable 268 can be a category 5 cable that has 8 wires arranged in 4 twisted pairs. Each of the twisted pairs has a signal wire and a ground wire that is wound around the signal wire. The ground wire reduces cross-talk noise and increases the transmission speed of electrical signals carried by Ethernet cable 268. In another embodiment, Ethernet cable 268 can contain more than 8 total wires (e.g. 16 or 20 wires). According to one aspect of the disclosure, a subset (e.g., 2) of the individual signal wires within Ethernet cable 268 are assigned for general system and network communication between IM 130 (based in part on triggering commands received from MC 110) and BCs 162A-D. Additionally, at least one signal wire in each of Ethernet cables 268 is assigned as a global throttle wire 273 for a specific connected one of the block controllers 162A-D to provide communication of a GTPR signal from the infrastructure controller 224 to the specific associated block controller 162A-D. In addition, at least one other signal wire in each of the Ethernet cables 268 is assigned as a global reset wire 271 for a specific connected one of the block controllers 162A-D to allow for expedient communication of a reset signal from the MC 110 via the infrastructure controller 224 to the specific associated block controller 162A-D. While described as communications between the infrastructure controller 224 and block controllers 162A-D, it is appreciated that the commands to perform global throttling or global resets are generated by the MC 110 and routed through the IM 130 and specifically the infrastructure controller 224. One aspect of the disclosure is an appreciation that to ensure effective operation of the information handling system after a decrease in available power, it may be necessary to reduce the power requirements of one or more components of the information handling system. In particular, it may be necessary to reduce power consumption of processing nodes that consume high levels of power during normal operation.

Processing blocks 160A-D comprise BCs 162A-D, fan modules 142-145, pulse width modulation circuit (PWM) 240 and temperatures sensors 146. BCs 162A-D are communicatively connected to fan modules 142-145 via PWM 240. The cooling levels of fan modules 142-145 can be selectively regulated by PWM output signals produced by PWM 240. BCs 162A-D are also communicatively connected to temperature sensor 144. Each of BCs 162A-D contains a field programmable gate array (FPGA) 260 that contains pre-determined processing node global throttle data settings 262. Global throttle data settings 262 designate at least one of the processing nodes 164A-D to reduce power in response to a controlling BCs 162A-D receiving a GTPR signal via first global throttle wire 272 and second global throttle wire 273. The second global throttle wire 273 is specifically connected to a respective FPGA 260 of BCs 162A-D.

Within each of blocks 160A-D are at least one, and likely a plurality of processing/functional nodes, such as nodes 164A-D, which are generally referred to herein as processing nodes. Each processing node 164A-D contains a node power distribution subsystem 250A-D that receives and controls power distributed to nodes 164A-D. Each of the node power distribution subsystems 250A-D is communicatively connected to a respective BC 162A-D by an I2C bus 218 and serial bus 214 for the transmission of general data and signals. Additionally, a reset wire 270 is communicatively connected between each of the node power distribution subsystems 250A-D and an associated BC 162A-D to enable communication of a reset signal from the associated BC 162A-D to the specific node 164A-D. A global throttle wire 274 is also communicatively connected between each of the node power distribution subsystems 250A-D and a respective FPGA 260 within BCs 162A-D to enable communication of a GTPR signal from the associated BC 162A-D to the specific node 164A-D. Both reset wire 270 and global throttle wire 274 can be individual wires that are assigned within a same Ethernet cable connecting the MC 110 to a corresponding one of BCs 162A-D. Each of the node power distribution subsystems 250A-D are connected to modular power busbar 156 to receive power from PSUs 152. Each of the node power distribution subsystems 250A-D contains associated board controller(s) 280A-D that control the operations of a respective node power distribution subsystem 250A-D. Board controller(s) 280A-D can track and record power usage data and settings 281 for each of the processing nodes 164A-D.

Figure 3:
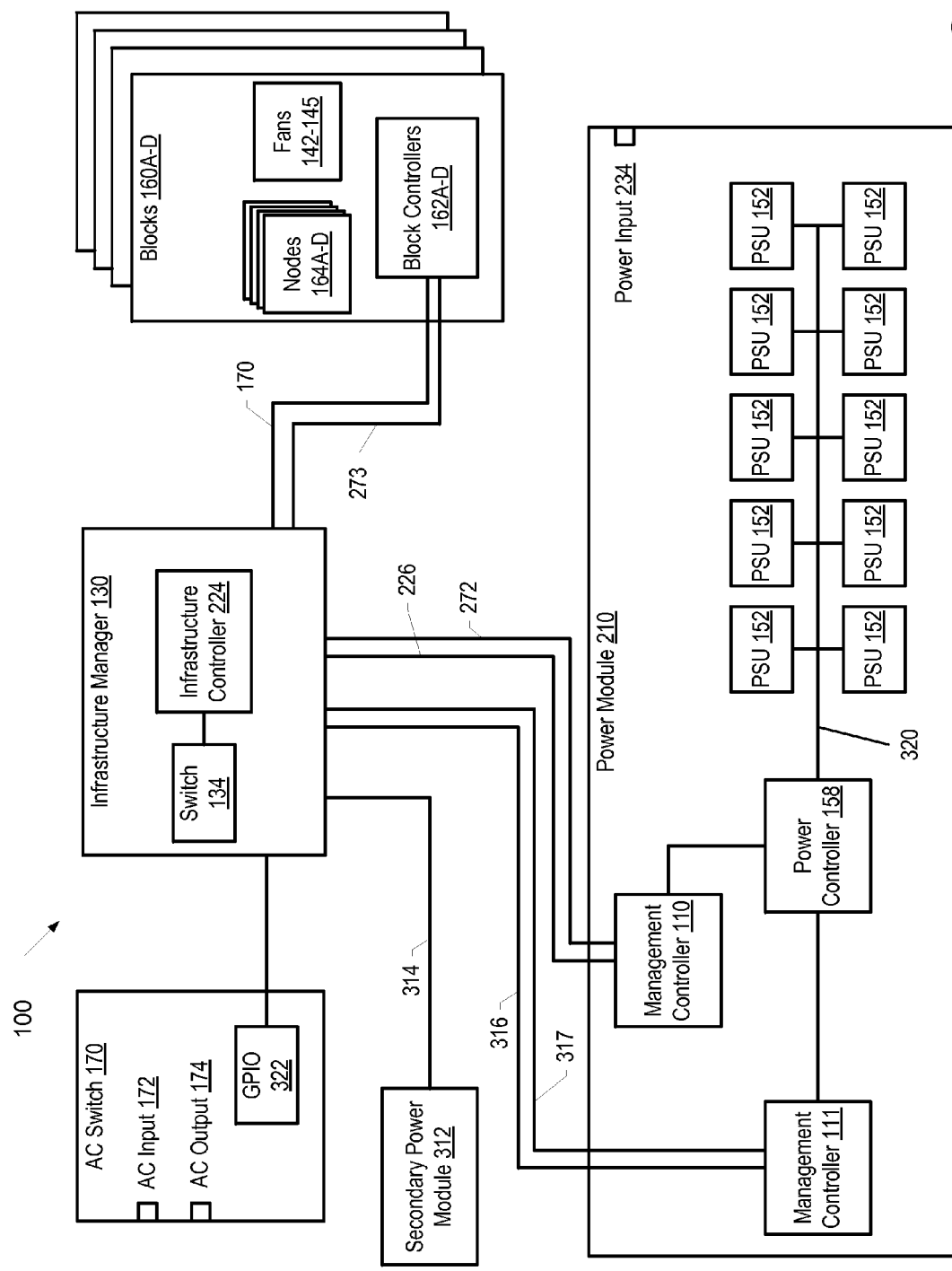
FIG. 3 is a block diagram further illustrating the connectivity of components within the rack-based information handling system and specifically further illustrates components of the power module, in accordance with one embodiment.

FIG. 3 illustrates further details of the connectivity of functional components within IHS 100 to implement a global throttling of power usage by the overall system. The global throttling is provided by dynamically and/or autonomously triggering a reduction in power consumption by at least one of the nodes via a global throttle command signal sent from the MC 110, 111 to an associated block controller 162. Referring specifically to FIG. 3, IHS 100 comprises a power module 210 that includes a power controller (PC) 158 communicatively connected to each of ten PSUs 152. Power module 210 provides regulated power to IHS 100. While ten (10) PSUs 152 are shown, more or less PSUs 152 can be used within power module 210. PC 158 coordinates the operation, timing and communications of functional components within power module 210. PC 158 is further communicatively connected to MC 110 and 111. MC 110 and 111 can receive power supply data and settings from PSUs 152 via PC 158.

Power module 210 receives AC power from AC switch box 170 at AC power input terminal 234 that provides a source of AC power to PSUs 152. AC switch box 170 has an AC input terminal 172 and an AC output 174. AC switch 170 has a general purpose input/output interface (GPIO) 322 that is communicatively connected to IM 130.

MC 110 is communicatively connected to IM 130 by Ethernet cable 226. At least one of the wires in the Ethernet cable 226 is allocated as a global throttle wire 272 to provide communication of a global throttle power reduction (GTPR) signal from the rack-level management controller 110 to the IM 130. MC 111 is communicatively connected to IM 130 by Ethernet cable 316. At least one of the wires in the Ethernet cable 316 is allocated as a global throttle wire 317 to provide communication of a global throttle power reduction (GTPR) signal from the rack-level management controller 111 to the IM 130.

Infrastructure manager 130 comprises a switch 134 that is communicatively connected to infrastructure controller 224. Another set of Ethernet cables 170 are communicatively connected between IM 130 and each of blocks 160A-D. Ethernet cables 170 each comprise a plurality of individual wires (e.g., 8 wires). According to one aspect of the disclosure, a subset (e.g., 4) of the individual wires within Ethernet cable 170 can be used for general system and network communication between IM 130 and BCs 162A-D. Additionally, at least one wire in Ethernet cables 170 is allocated as a global throttle wire 273 for a specific connected one of the block controllers 162A-D to provide communication of a GTPR signal from the infrastructure controller 224 to the specific associated block controller 162A-D. Processing blocks 160A-D comprise BCs 162A-D, fan modules 142-145 and processing nodes 164A-D.

IHS 100 can optionally include at least one other secondary power module 312, to provide a redundant power module that in one embodiment, both simultaneously supplies and regulates power to IHS 100. The redundant configuration of power modules 210/312 enables IHS 100 to continue operating following a failure of either of the power modules 210/312 or in the event one of the power modules 210/312 is taken offline for maintenance.

FIGS. 4A, 4B and 4C illustrate further details of the contents of management controller memory 114 and storage 120. With specific reference to FIG. 4A, management controller memory 114 can store rack-level management and control (RMC) firmware 115, which is inclusive of the firmware that controls the operation of MC 110 in communicating with and managing the down-stream components of IHS 100. Management controller memory 114 stores current node power consumption 402 for each of the processing nodes 164, a system power cap 404 for the overall IHS 100, a node power budget 406 for each of the processing nodes 164 within the various blocks 160A-D and a total system power available 408. Management controller memory 114 further stores a total number of active PSUs 410, a power budget allocation 412 for each of the blocks 160A-D and for respective nodes 164A-D within each of the separate blocks 160A-D. Additionally, MC memory 114 maintains cooling levels 414 for the operation of fans 142-145.

FIG. 4B illustrates contents of control parameters 122 stored within MC storage 120. Control parameters 122 are used by MC 110 during rack-level power system control operations of IHS 100. Control parameters 122 can contain a node maximum power 420 that is the maximum amount of power that each node among processing nodes 164 can consume and node power consumption history 422, which is a record of the power previously used during a pre-established most recent time period by each of processing nodes 164. Control parameters 122 also contain a system power cap threshold 424, a temperature threshold 426, and a backup battery power threshold 428. The system power cap threshold 424 is a pre-determined maximum amount of power that IHS 100 can consume before an action to reduce power consumption is initiated. The temperature threshold 426 is the maximum temperature that IHS 100 can reach before an action to reduce power consumption is initiated. The backup battery power threshold 428 is the threshold level of backup battery power remaining in battery 153, when IHS 100 is consuming power from backup battery 153, before an action to reduce power consumption is initiated.

FIG. 4C illustrates contents of algorithms 124 for fan and/or power and/or control stored within MC storage 120. Algorithms 124 are used by MC 110 during rack-level power system control operations of IHS 100. Algorithms 124 include a control algorithm 440, one or more power algorithms 442, and one or more fan algorithms 444. Control algorithm 440, power algorithms 442, and fan algorithms 444 are used within rack-level management and control (RMC) firmware 115 by MC 110 to regulate an amount of power supplied to one or more of the processing nodes 164 of IHS 100.

Figure 5:
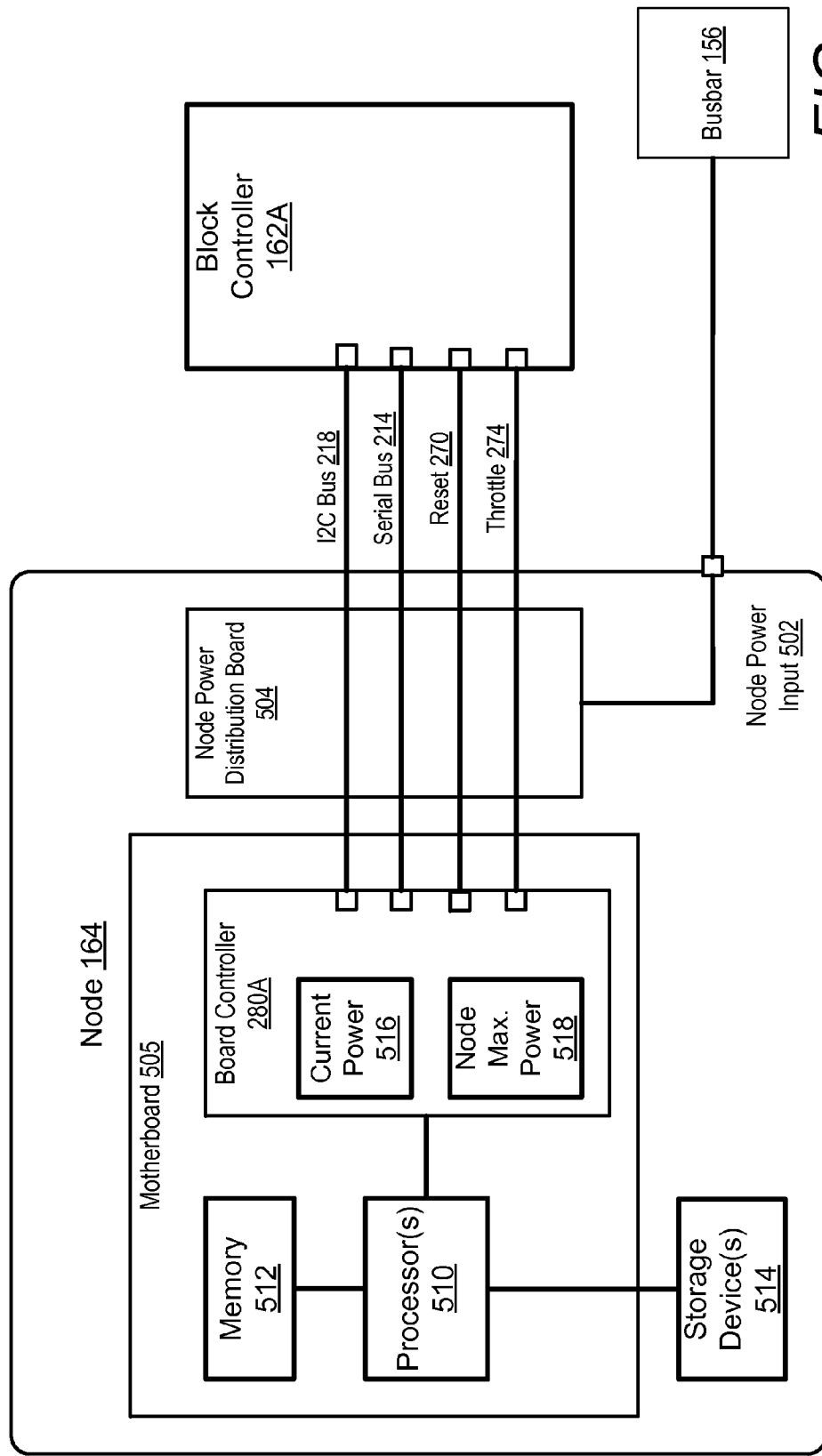
FIG. 5 is a block diagram illustrating example components of a processing node within the information handling system, in accordance with one embodiment.

With reference now to FIG. 5, there is illustrated one embodiment of a single processing node 164. In some embodiments, processing node 164 is sometimes called a sled, which generally represents the chassis on which the processing node is built and which can be slid into and out of the front bay of the rack chassis. Processing node 164 has a power input terminal 502 that receives power from busbar 156. Power input terminal 502 is connected to a node power distribution board 504. Processing node 164 comprises a motherboard 505 that includes one or more processor(s) 510 communicatively connected to a system memory 512 and storage device(s) 514. Storage device(s) 514 can be utilized to store one or more software and/or firmware modules and/or data (not specifically shown). In one embodiment, storage device(s) 514 can be a hard drive or a solid state drive. It is also appreciated that in some embodiments, the "processing node" sled can actually be a storage device sled, hosting a large number of storage devices that are specifically configured to store mass amounts of data. Processor(s) 510 are also communicatively connected to a board controller 280A. In one embodiment, board controller 280A can reside on motherboard 505 that also contains processor(s) 510. Board controller 280A can contain non-volatile memory and/or firmware that contains data about the current power 516 being drawn or consumed by processing node 164 and the maximum power 518 that processing node 164 can draw or consume.

Board controller 280A is communicatively connected to BC 162A by an I2C bus 218 and by a serial bus 214 that are connected via node power distribution board 504. Global throttle wire 274 and reset wire 270 are also communicatively connected between BC 162A and board controller 280A by conductors that are routed through node power distribution board 504. In one embodiment, board controller 280A can be omitted and I2C bus 218, serial bus 214, global throttle wire 274 and reset wire 270 can be directly connected to motherboard 505. Global throttle wire 274 enables communication of a GTPR signal from the BC 162A to board controller 280A. Upon receipt of the GTPR signal, board controller 280A triggers at least one of the components of processing node 164 to reduce a current amount of power being consumed. In one embodiment, receipt of the GTPR signal triggers processor(s) 510 to reduce processing speed and/or enter a lower power operating state. In another embodiment, receipt of the GTPR signal triggers storage device(s) 514 to enter a lower power operating state.

FIGS. 6-10 illustrate flowcharts of exemplary methods by which rack-level management controller 110 within the preceding figures performs different aspects of the processes that enable the one or more embodiments of the disclosure. Generally, methods 600, 700, 800, 900 and 1000 collectively represent computer-implemented methods. The description of each method is provided with general reference to the specific components illustrated within the preceding FIGS. 1-5. Generally each method is described as being implemented via rack-level management controller 110 and particularly the execution of code provided by rack-level management and control (RMC) firmware 115 within microcontroller (or processor) 112. The execution of this RMC firmware 115 results in the implementation of rack-level power control and global throttling, which leads to a reduction in overall system power consumption by processing nodes in a rack-configured IHS 100. It is, however, appreciated that certain aspects of the described methods may be implemented via other processing devices and/or execution of other code. Also, each different block represented in the flow charts is referred to as a process (e.g., process "xyz"), with the understanding that the overall method can involve several of these blocks operating together, in sequence or concurrently with each other to perform a specific function.

Figure 6:
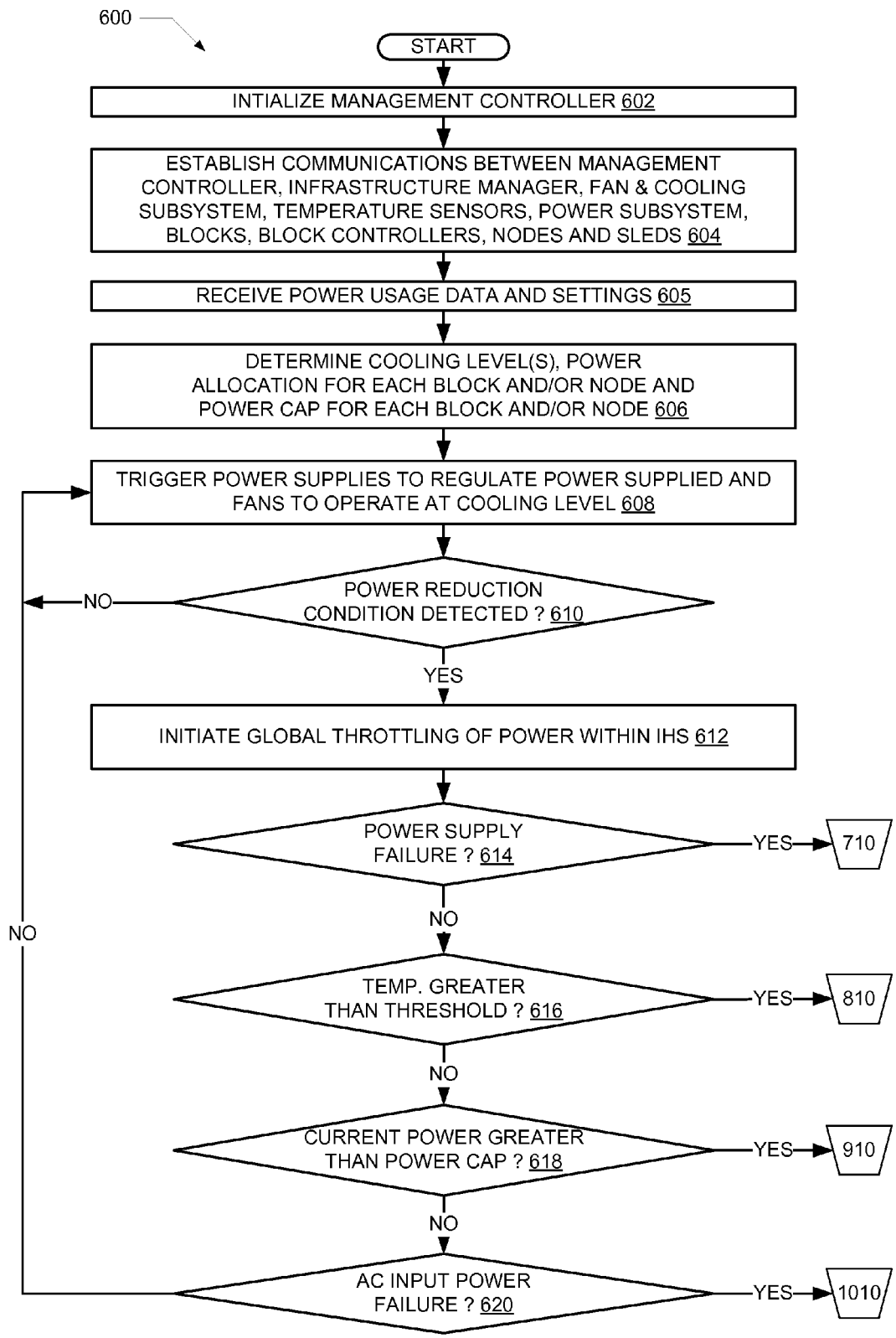
FIG. 6 is a flow chart illustrating one example of the method by which rack-level power control of processing nodes within a rack-based information handling system is performed, according to one or more embodiments.

With specific reference to FIG. 6, method 600 illustrates a process for rack-level power control of processing nodes within a rack-based IHS. Method 600 begins at the start block and proceeds to process 602 where MC 110 is initialized. The initialization of MC 110 includes microcontroller 112 loading RMC firmware 115 and loading at least one of the control parameters 122 and/or fan and/or power and/or control algorithms 124. At process 604, MC 110 establishes communications with IM 130, fan and cooling subsystem 140, temperature sensors 144, power subsystem 150, blocks 160A-D, block controllers 162A-D and processing nodes 164A-D. MC 110 receives power usage data and settings 281 for each of the processing nodes 164A-D (process 605). MC 110 determines the cooling levels 414, the system power cap 404, and the node power budget 406 for each of the blocks and/or processing nodes within the blocks. MC 110 also determines the power budget allocation 412 for each block and by extension each of the processing nodes (process 606). MC 110 triggers the power subsystem 150 to supply power to each of the blocks 160A-D and processing nodes 164A-D based in part on the power budget allocation 412 (process 608).

MC 110 detects, at process 610, whether a condition that reduces the total amount of available power 408 for distribution within IHS 100 has occurred. In response to not detecting a condition that reduces the total amount of available power for distribution within IHS 100, MC 110 continues to trigger the power subsystem 150 to supply power to each of the blocks 160A-D and processing nodes 164A-D based on the respective power budget allocation 412 (process 608). In response to detecting a condition that reduces the total amount of available power for distribution within IHS 100, MC 110 autonomously initiates a global throttling of the allocated power within IHS 100 to reduce the power consumption of at least one of the processing nodes 164A-D (process 612).

According to one aspect, MC initiates the global throttling by forwarding the global throttle signal via global throttle wires 272 and 273, which are communicatively connected between MC and each associated block controller 162A-D. Thus, initiating global throttling of power allocation within IHS 100 in process 612 includes MC 110 generating a signal that is transmitted on global throttle wires 272, 273, which are allocated within each Ethernet cable 170, 226 directly connecting each block controller 162A-D within the IHS 100 with the MC 110. With this configuration, the block controllers 162A-D within the IHS 100 are pre-programmed to respond to an assertion of a signal on the global throttle wires 272, 273 by MC 110 by immediately throttling operations of one or more processing nodes 164A-D within a respective block 160A-D being controlled by the block controller 162A-D.

At process 614, MC 110 determines if a power supply failure has occurred. In response to detecting that a power supply failure has occurred, MC 110 initiates process 710 of method 700. In response to detecting that a power supply failure has not occurred, MC 110 determines if the overall temperature readings of IHS 100 are above a system temperature threshold 426 (process 616). In response to the overall temperature readings of IHS 100 being above a system temperature threshold 426, MC 110 initiates process 810 of method 800. In response to the overall temperature readings of IHS 100 not being above a system temperature threshold 426, MC 110 determines if the current power demand across IHS 100 is greater than the maximum system power cap threshold 424 (process 618). In response to the current power demand across IHS 100 being greater than the maximum system power cap threshold 424, MC 110 initiates process 910 of method 900. In response to the current power demand across IHS 100 not being greater than the maximum system power cap threshold 424, MC 110 determines if an AC input power failure has occurred (process 620). In response to an AC input power failure occurring, MC 110 initiates process 1010 of method 1000. In response to an AC input power failure not occurring, MC 110 continues to trigger the power subsystem 150 to supply power to each of the blocks 160A-D and processing nodes 164A-D based on the power budget allocation 412 (process 608).

Figure 7:
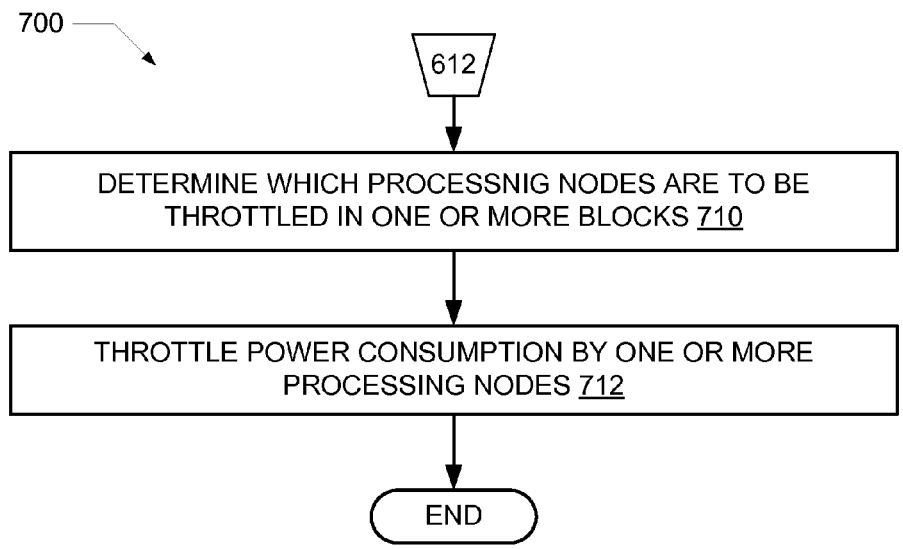
FIG. 7 is a flow chart illustrating one example of the method by which power reduction is performed in the event of a power supply failure within the information handling system, according to one or more embodiments.

Turning now to FIG. 7, a flow chart illustrating an example method 700 to enable power reduction within IHS 100 in the event of a power supply failure is shown. Method 700 begins at process 710 where one or more block controllers 162A-D determine which processing nodes of the corresponding block are to be throttled in order to reduce power consumption by the corresponding block. Field programmable gate array (FPGA) 260 contains pre-determined processing node global throttle data settings 262. The global throttle data settings 262 designate at least one of the processing nodes 164A-D to reduce power in response to a controlling BCs 162A-D receiving a GTPR signal via one of first global throttle wire 272 and second global throttle wire 273. One or more of the block controllers 162A-D are pre-configured to throttle operations of the end processing nodes that are required to operate at a lower power or with a lower power consumption budget to reduce power consumption within the corresponding blocks (process 712). Once a PSU failure is detected, reducing the amount of available power for distribution, MC 110 receives a PSU failure signal and in turn transmits a global throttle signal alerting the rest of the IHS 100 that a PSU 152 has failed and that certain protective measures are required in response to that failure. Method 700 then ends.

Figure 8:
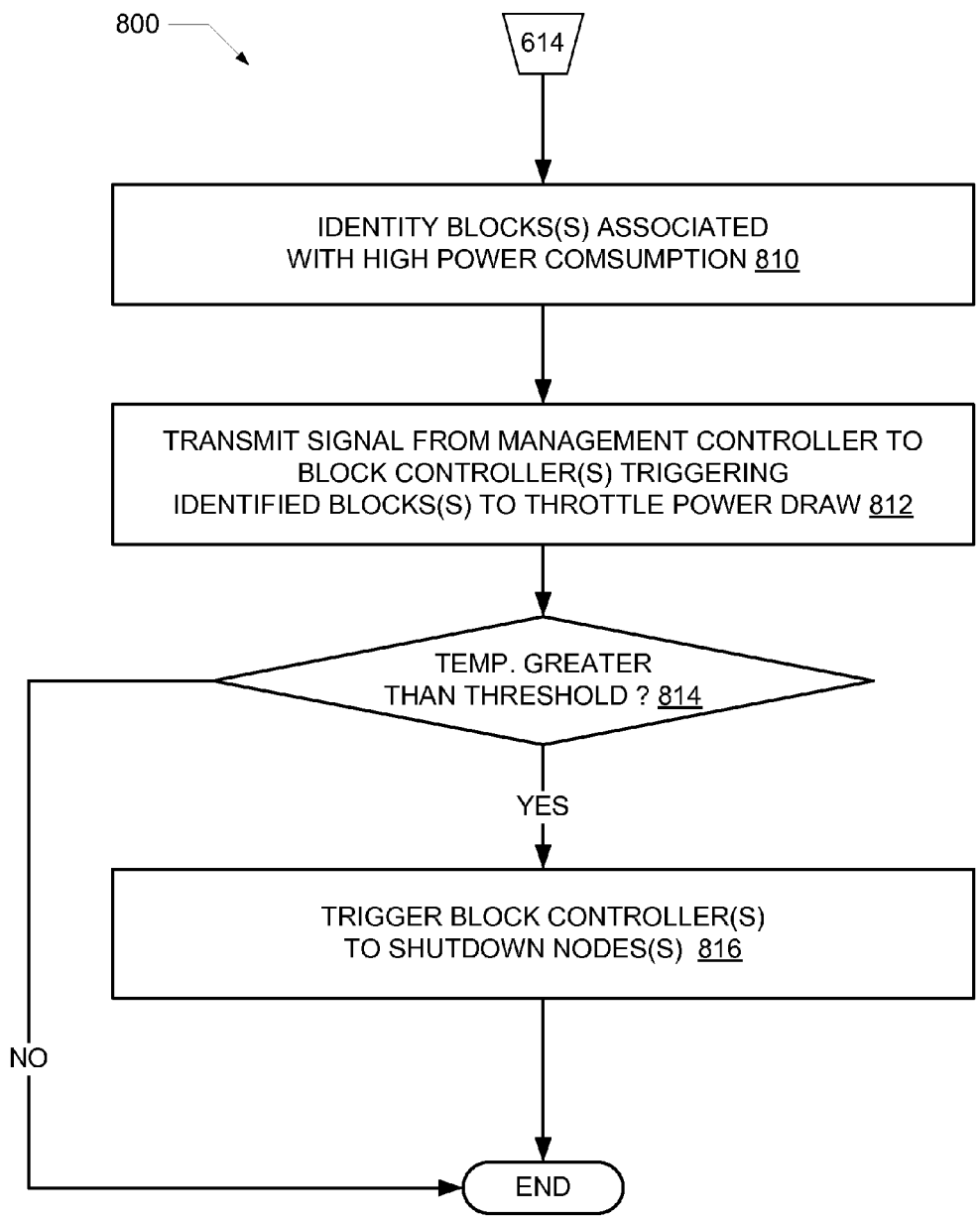
FIG. 8 is a flow chart illustrating one example of the method by which power reduction is performed in the event of high thermal readings within the information handling system, according to one or more embodiments.

FIG. 8 illustrates a flow chart of a method to reduce power in the event of high temperature readings within IHS 100. Method 800 begins at process 810 where MC 110 identifies at least one of blocks 160A-D drawing large amounts of power and contributing to higher than normal thermal readings (detected using locally-placed sensor). MC 110 transmits a global throttle control signal, via global throttle wires 272, 273, to each block controller 162A-D corresponding to the identified block to throttle power consumption at the block level and/or node level. The global throttle control signal triggers the block controllers 162A-D to reduce power to at least one of the processing nodes (process 812). MC 110 determines if the overall temperature readings of IHS 100 are still above a system temperature threshold 426 (process 814) after power has been reduced to one or more processing nodes. In response to the temperature readings of the identified high temperature block still being above the system temperature threshold 426, MC 110 triggers the block controller 162A-D corresponding to the identified block to shutdown at least one of the processing nodes (process 816). Method 800 then ends. In response to the temperature readings of the identified high temperature block being below the system temperature threshold 426 after power has been reduced to one or more processing nodes, method 800 terminates.

Figure 9:
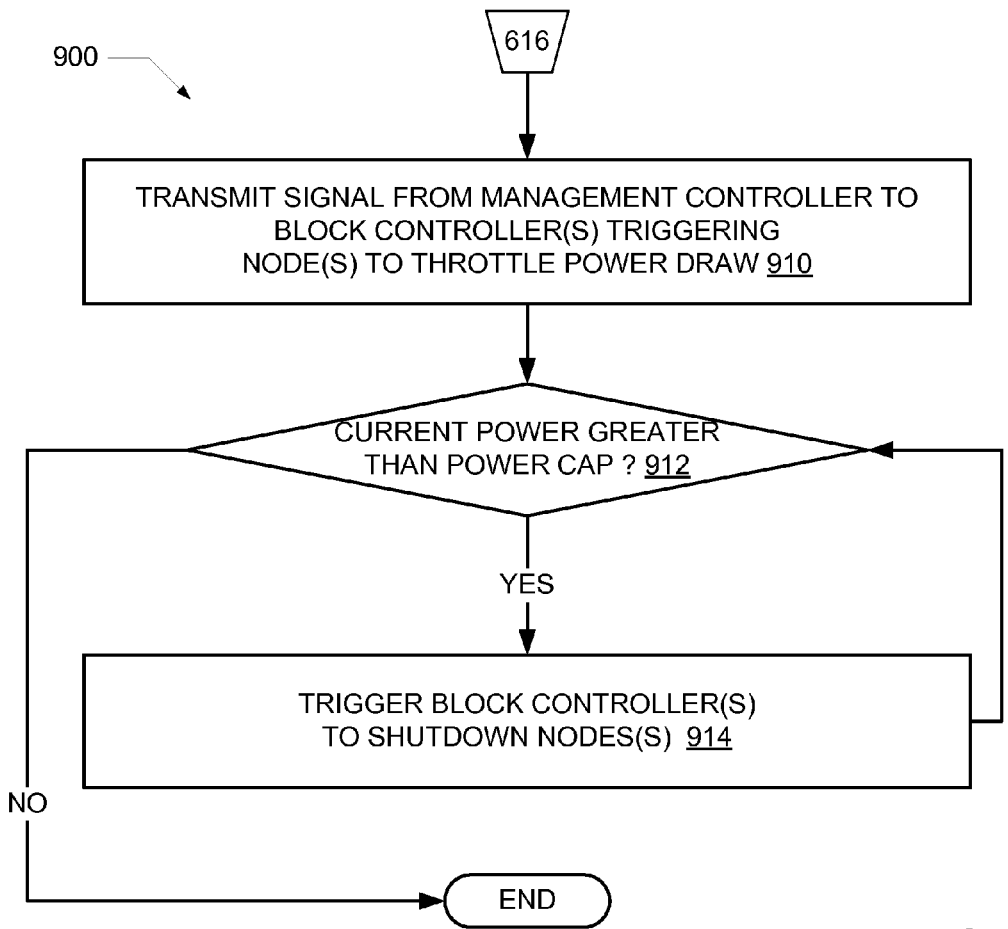
FIG. 9 is a flow chart illustrating one example of the method by which power reduction is performed in the event of a current power demand exceeding the maximum power capacity within the information handling system, according to one or more embodiments.

FIG. 9 illustrates a flow chart of a method to reduce power in the event current system power demand exceeds the maximum system power cap threshold 424 within IHS 100. Method 900 begins at block 910 where MC 110 transmits a signal, via global throttle wires 272, 273, to one or more block controllers 162A-D to throttle power consumption. The global throttle signal triggers the block controllers to reduce power consumption by at least one of the processing nodes. MC 110 determines if the current system power demand still exceeds the maximum system power cap threshold 424 after one or more processing nodes have reduced their power consumption (block 912). In response to the current system power demand exceeding the maximum system power cap threshold 424, MC 110 triggers one or more block controllers 162A-D to shutdown at least one of the processing nodes (block 914). MC 110 then returns to process 912 to determine if the current system power demand still exceeds the maximum system power cap threshold 424. If the current system power demand still exceeds the maximum system power cap threshold 424, MC 110 triggers one or more block controllers 162A-D to shutdown additional processing nodes (process 914). In response to the current system power demand being less than the maximum system power cap threshold 424, method 900 terminates.

Figure 10:
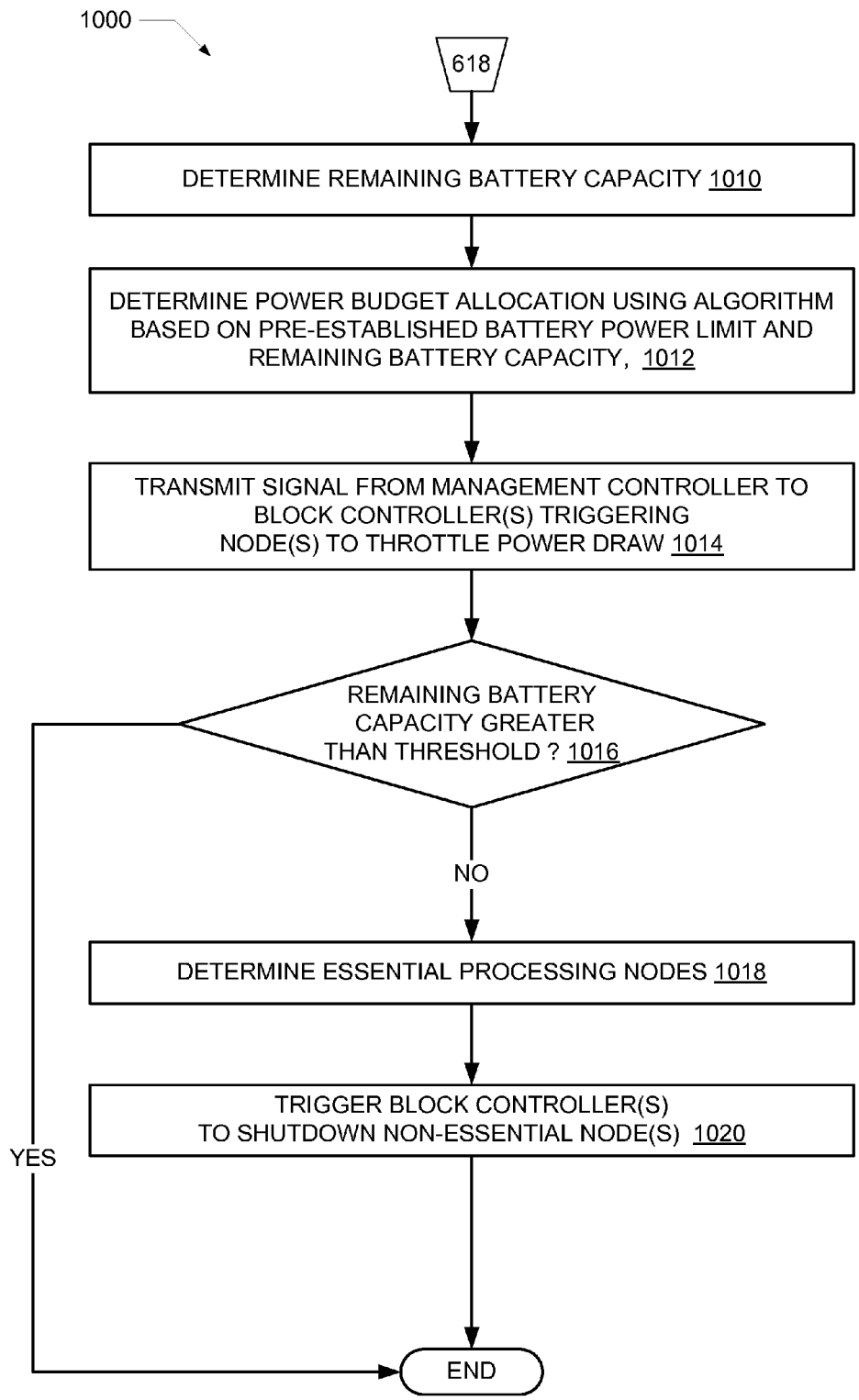
FIG. 10 is a flow chart illustrating one example of the method by which power reduction is performed in the event of an AC input power failure within the information handling system, according to one or more embodiments.

FIG. 10 illustrates a flow chart of a method to reduce power in the event of an AC input power failure within IHS 100. Method 1000 begins at process 1010 where MC 110 determines the remaining battery capacity of backup battery 153. MC 110 determines a power budget allocation 412 using a power algorithm 442 based on a pre-established battery power limit and the remaining battery capacity (process 1012). The power algorithm 442 is a specific algorithm that is associated with the operation of IHS 100 on backup battery power. MC 110 transmits a signal, via global throttle wires 272, 273, to one or more block controllers 162A-D to throttle power consumption and triggers the block controllers 162A-D to reduce power consumption by at least one of the processing nodes (process 1014). The reduction in power consumption by the processing nodes extends the battery life of the backup battery 153. MC 110 determines if the remaining battery capacity is greater than a backup battery power threshold 428 after one or more processing nodes have reduced their power consumption (process 1016). In response to the remaining battery capacity being less than the backup battery power threshold 428, MC 110 determines which of the nodes are essential nodes (process 1018) and triggers one or more block controllers 162A-D to shutdown at least one of the non-essential nodes (process 1020). Method 1000 then ends. In response to the remaining battery capacity being greater than the backup battery power threshold 428, method 1000 terminates. In one embodiment, global throttling can be applied within rack-based IHS to allow for a reduction of the size of the PSUs and/or the backup battery that is/are required for the information handling system. Thus, for example, method 1000 can be implemented to reduce the size of the backup battery 153 to a smaller size than would otherwise be required in the IHS that operates without the use of method 1000.

Figure 11:
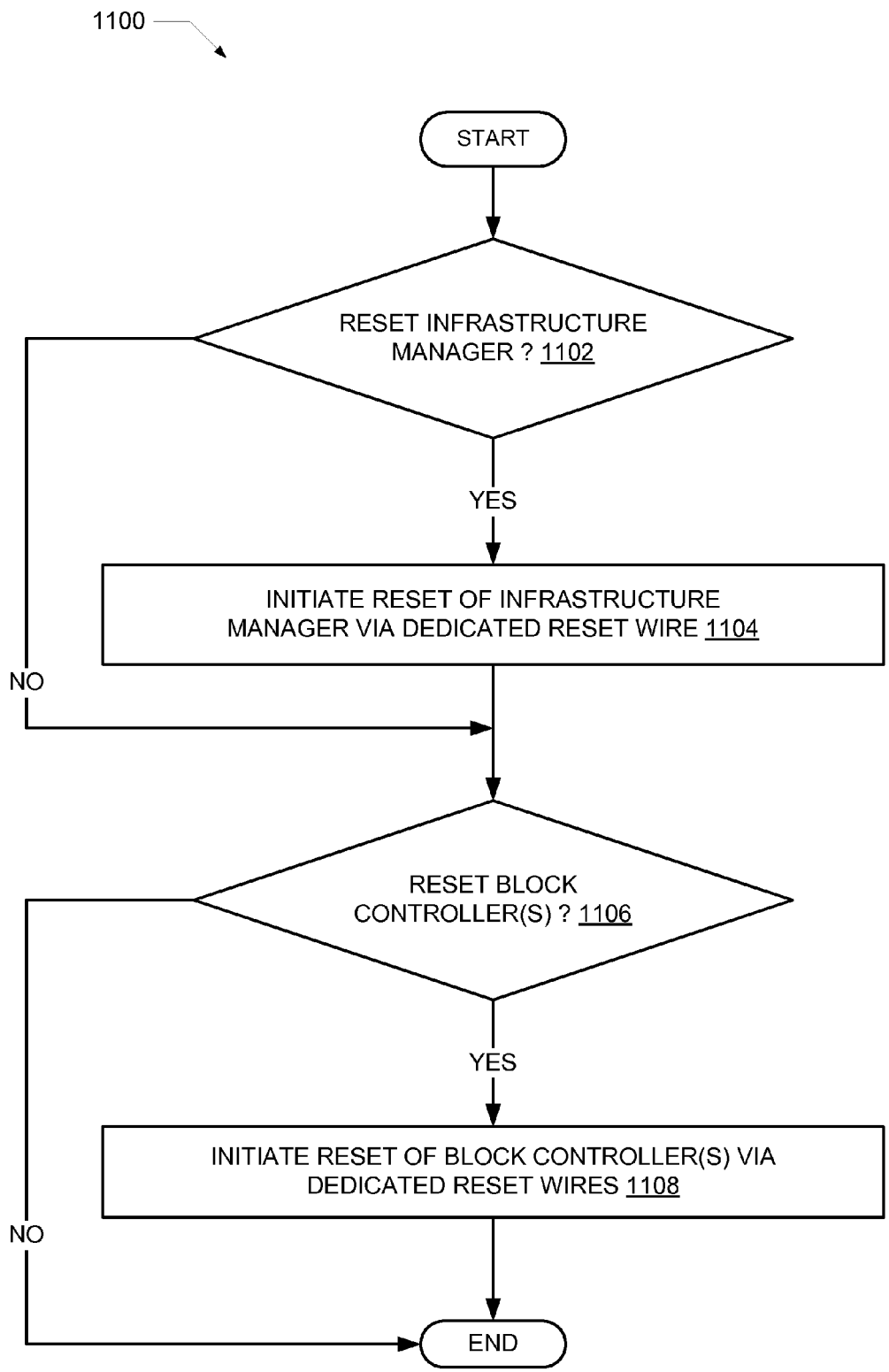
FIG. 11 is a flow chart illustrating one example of the method by which the infrastructure manager and/or block controllers are reset within the information handling system, according to one or more embodiments.

FIG. 11 illustrates a flow chart of a method for MC 110 to reset infrastructure manager 130 and/or one or more block controllers 162 within IHS 100. Method 1100 begins at process 1102 where MC 110 determines if a condition is detected or has occurred within IHS 100 that is pre-established to trigger a reset of infrastructure manager 130. In response to detecting a condition that triggers the reset of infrastructure manager 130, MC 110 transmits a reset signal on global reset wire 269 to infrastructure manager 224 triggering a reset of infrastructure manager 130 (process 1104). At process 1106, MC 110 then determines if a reset of one or more block controllers 162 is required. In response to detecting that one or more block controllers 162 are to be reset, MC 110 transmits a reset signal on one or more reset wires 271 connected to the identified one of the block controllers 162. The reset signal triggers a reset of the specific block controller/s 162 (process 1108). Method 1100 then terminates. In response to detecting that none of the block controllers 162 are to be reset, method 1100 ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method that implements rack-level power control of processing nodes in a rack-configured information handling system, the method comprising:

receiving, at a rack-level management controller, power-usage data, operating parameters, and settings information associated with one or more processing nodes within one or more separately-controlled blocks of the information handling system (IHS);

triggering a power subsystem of the IHS to regulate an amount of power supplied to one or more of the processing nodes of the information handling system based on the received information for the one or more processing nodes and a total amount of available power for distribution within the IHS; and in response to detecting a condition that reduces the total amount of available power for distribution within the IHS, the rack-level management controller autonomously initiating global throttling of power allocation within the IHS to reduce power consumption by at least one of the processing nodes via a separate block controller, wherein the global throttling is triggered by asserting a global throttle wire that is a subset of available wires within an Ethernet cable interconnecting the rack-level management controller and one or more block-level controllers;

wherein the communication between the management controller and each of the one or more block controllers occurs over an Ethernet cable, which has a subset of individual signal wires assigned for general system and network communication between an infrastructure manager and the one or more block controllers, based in part on triggering commands received from the management controller;

wherein at least one signal wire in the Ethernet cable is assigned as a global throttle wire for a specific connected one of the one or more block controllers to provide communication of a GTPR signal from the infrastructure controller to the specific block controller; and wherein at least one other signal wire in the Ethernet cable is assigned as a global reset wire for a specific connected one of the one or more block controllers to allow for expedient communication of a reset signal from the management controller via the infrastructure controller to the specific block controller.

2. The method of claim 1, further comprising:

initializing the management controller during start up configuration of the IHS;

establishing communication between the management controller, the power subsystem, and one or more block controllers that each control block-level operations of processing nodes within a corresponding block;

retrieving power profile data for each block within the IHS, the power profile data comprising the power-usage data and settings information of the individual processing nodes within the particular block;

generating a power allocation for each block based on the received power profile data; and triggering the power subsystem to supply power to each block and by extension to each of the nodes based on the power allocation for that block.

3. The method of claim 1, wherein the condition is one of a power supply unit (PSU) failure and an AC input power failure, and the method further comprises:

determining which condition has occurred;

in response to determining that the PSU failure has occurred, transmitting a signal to at least one of the block controllers to reduce power to at least one of the nodes, wherein an overall power is reduced by a first amount correlated to a loss of a PSU; and in response to determining that the AC input power failure has occurred, transmitting a signal to at least one of the block controllers to reduce power to at least one of the nodes, wherein an overall power is reduced by a second amount correlated to a loss of an AC input.

4. The method of claim 3, further comprising:

determining via at least one block controller, which processing nodes of the corresponding block are to be throttled in order to reduce power consumption by the corresponding block; and the at least one of the block controller subsequently throttling operations of the processing nodes that are to be throttled within the corresponding blocks.

5. The method of claim 1, further comprising:

establishing a maximum power capacity for the information handing system;

monitoring a total power usage and demand across the IHS; and in response to determining that a current power demand across the IHS is greater than the maximum power capacity, transmitting a signal to at least one of the block controllers to reduce power to at least one of the nodes.

6. The method of claim 1, wherein initiating global throttling of power allocation within the IHS to reduce power consumption by at least one of the processing nodes via an associated block controller comprises generating a signal on a global throttle wire allocated within each Ethernet cable directly connecting each block controller within the IHS with the management controller, wherein the block controllers within the IHS are pre-programmed to respond to an assertion of a signal on the global throttle wire by the management controller by immediately throttling operations of one or more processing nodes within a respective block being controlled by the block controller.

7. The method of claim 1, further comprising:
in response to detecting that the overall thermal readings of the IHS are above a system thermal threshold, identifying at least one block drawing large amounts of power and contributing to higher than normal thermal threshold readings; and
transmitting a signal to at least each block controller corresponding to the identified at least one block to reduce power consumption by the at least one node.

8. The method of claim 1, further comprising:
determining whether the condition remains present after reducing power to at least one of the nodes; and
in response to the condition remaining present, triggering at least one of the block controllers to shut down at least one of the nodes.

9. The method of claim 1, further comprising:
determining whether at least one of an infrastructure manager or the block controllers are to be reset;
in response to determining that at least one of the infrastructure manager or the block controllers are to be reset, generating a reset signal on a reset wire allocated within each Ethernet cable directly connecting the management controller with the infrastructure manager and the block controllers, wherein the reset signal triggers at least one of the infrastructure manager or the block controllers to reset.

10. A rack-level power control system comprising:
a rack-level management controller having a processor and a memory coupled to the processor via a system interconnect;
a power subsystem communicatively coupled to the rack-level management controller;
a cooling subsystem communicatively coupled to the rack-level management controller;
one or more blocks communicatively coupled to the rack-level management controller, the blocks having at least one block controller communicatively coupled to the rack-level management controller and each of the blocks having one or more processing nodes; and
an Ethernet cable connected between the rack-level management controller and at least one of the block controllers, wherein: at least one of the wires in the Ethernet cable allocated as a global throttle wire to provide communication of a global throttle power reduction signal from the rack-level management controller to at least one of the block controllers and at least one of the nodes allowing an immediate reduction in power usage by the processing nodes upon receipt of the global throttle power reduction signal; a subset of individual signal wires within the Ethernet cable is assigned for general system and network communication between an infrastructure manager and the one or more block controllers, based in part on triggering commands received from the management controller; and at least one other signal wire in the Ethernet cable is assigned as a global reset wire for a specific connected one of the one or more block controllers to allow for expedient communication of a reset signal from the management controller via the infrastructure controller to the specific block controller.

11. The rack-level power control system of claim 10, further comprising:
an infrastructure manager communicatively connected via the Ethernet cable between the rack-level management controller and at least one of the block controllers, the infrastructure manager comprising a switch communicatively coupled to an infrastructure controller.

12. The rack-level power control system of claim 11, wherein the infrastructure controller selectively routes the global throttle power reduction signal via the Ethernet cable to at least one selected block controller.

13. The rack-level power control system of claim 11, wherein the Ethernet cable further comprises:
a rack-level Ethernet cable connected between the management controller and the infrastructure manager, the rack-level Ethernet cable having a first global throttle to provide communication of the global throttle power reduction signal from the rack-level management controller to the infrastructure manager; and
at least one block level Ethernet cable connected between the infrastructure manager and at least one of the block controllers, the block level Ethernet cable having a second global throttle wire to provide communication of the global throttle power reduction signal from the infrastructure manager to at least one of the block controllers.

14. The rack-level power control system of claim 10, wherein the power subsystem further comprises:
at least one power supply unit communicatively coupled to the management controller, the management controller receiving power supply unit data and settings from the at least one power supply unit; and
an AC switch connected to the at least one power supply unit to supply power to the at least one power supply unit, the AC switch communicatively coupled to the management controller, the management controller receiving AC power data and settings from the AC switch.

15. The rack-level power control system of claim 14, further comprising:
at least one backup battery connected to at least one of the power supply units, wherein the management controller has firmware executing thereon that configures the rack-level management controller to:
in response to determining that an AC input power failure has occurred, transmitting a signal to at least one of the block controllers to reduce power to at least one of the nodes in order to extend operating life of the backup battery.

16. The rack-level power control system of claim 10, wherein the block controller further comprises:
a field programmable gate array that contains pre-determined processing node global throttle data designating at least one of the processing nodes to reduce power in response to receiving the global throttle power reduction signal.

17. The rack-level power control system of claim 10, wherein the cooling subsystem further comprises:
at least one temperature sensor that is communicatively coupled to the rack-level management controller, wherein the management controller has firmware executing thereon that configures the rack-level management controller to, in response to receiving a signal from a temperature sensor indicating that the overall thermal readings of the IHS are above a system thermal threshold:
identify at least one block drawing large amounts of power and contributing to higher than normal thermal threshold readings; and
transmit a signal to at least each block controller corresponding to the identified at least one block to reduce power consumption by the at least one node.

18. The rack-level power control system of claim 10, wherein the management controller has firmware executing thereon that configures the rack-level management controller to:
   in response to reducing power to at least one of the nodes, determine whether a condition that reduces the total amount of available power for distribution within the IHS remains; and
   in response to the condition remaining, trigger at least one of the block controllers to shut down at least one of the nodes.

19. The rack-level power control system of claim 10, wherein the management controller has firmware executing thereon that configures the rack-level management controller to: determine whether at least one of an infrastructure manager or the block controllers are to be reset;
   in response to determining that at least one of the infrastructure manager or the block controllers are to be reset, generate a reset signal on a reset wire allocated within each Ethernet cable directly connecting the management controller with the infrastructure manager and the block controllers, wherein the reset signal triggers at least one of the of the infrastructure manager or the block controllers to reset.

20. An information handling system (IHS) comprising:
   a rack having a plurality of block chasses;
   one or more blocks located within respective ones of the plurality of block chassis, the blocks having at least one block controller and each of the blocks having one or more processing nodes;
   a rack-level management controller having a processor a memory coupled to the processor via a system interconnect, the rack-level management controller communicatively coupled to the blocks, the block controllers and the processing nodes;
   a power subsystem communicatively coupled to the rack-level management controller;
   a cooling subsystem communicatively coupled to the rack-level management controller; and
   an Ethernet cable connected between the rack-level management controller and at least one of the block controllers, wherein: at least one of the wires in the Ethernet cable allocated as a global throttle wire to provide communication of a global throttle power reduction signal from the rack-level management controller to at least one of the block controllers and at least one of the nodes allowing an immediate reduction in power usage by the processing nodes upon receipt of the global throttle power reduction signal; a subset of individual signal wires within the Ethernet cable is assigned for general system and network communication between an infrastructure manager and the one or more block controllers, based in part on triggering commands received from the management controller; and at least one other signal wire in the Ethernet cable is assigned as a global reset wire for a specific connected one of the one or more block controllers to allow for expedient communication of a reset signal from the management controller via the infrastructure controller to the specific block controller.

21. The information handling system of claim 20, further comprising:
   an infrastructure manager communicatively connected via the Ethernet cable between the rack-level management controller and at least one of the block controllers, the infrastructure manager comprising a switch communicatively coupled to an infrastructure controller.

22. The information handling system of claim 21, wherein the infrastructure controller selectively routes the global throttle power reduction signal via the Ethernet cable to at least one selected block controller.

23. The information handling system of claim 21, wherein the Ethernet cable further comprises:
   a rack-level Ethernet cable connected between the management controller and the infrastructure manager, the rack-level Ethernet cable having a first global throttle to provide communication of the global throttle power reduction signal from the rack-level management controller to the infrastructure manager; and
   at least one block level Ethernet cable connected between the infrastructure manager and at least one of the block controllers, the block level Ethernet cable having a second global throttle wire to provide communication of the global throttle power reduction signal from the infrastructure manager to at least one of the block controllers.

24. The information handling system of claim 20, wherein the power subsystem further comprises:
   at least one power supply unit communicatively coupled to the management controller, the management controller receiving power supply unit data and settings from the at least one power supply unit; and
   an AC switch connected to the at least one power supply unit to supply power to the at least one power supply unit, the AC switch communicatively coupled to the management controller, the management controller receiving AC power data and settings from the AC switch.

25. The information handling system of claim 24, further comprising:
   at least one backup battery connected to at least one of the power supply units, wherein the management controller has firmware executing thereon that configures the rack-level management controller to:
   in response to determining that an AC input power failure has occurred, transmitting a signal to at least one of the block controllers to reduce power to at least one of the nodes in order to extend operating life of the backup battery.

26. The information handling system of claim 20, wherein the block controller further comprises:
   a field programmable gate array that contains pre-determined processing node global throttle data designating at least one of the processing nodes to reduce power in response to receiving the global throttle power reduction signal.

27. The information handling system of claim 20, wherein the cooling subsystem further comprises:
   at least one temperature sensor that is communicatively coupled to the rack-level management controller, wherein the management controller has firmware executing thereon that configures the rack-level management controller to:
   in response to receiving a signal from temperature sensor that the overall thermal readings of the IHS are above a system thermal threshold, identify at least one block drawing large amounts of power and contributing to higher than normal thermal threshold readings; and
   transmit a signal to at least each block controller corresponding to the identified at least one block to reduce power consumption by the at least one node.

28. The information handling system of claim 20, wherein the management controller has firmware executing thereon that configures the rack-level management controller to:

in response to reducing power to at least one of the nodes, determine whether a condition that reduces the total amount of available power for distribution within the IHS remains; and in response to the condition remaining, trigger at least one of the block controllers to shut down at least one of the nodes.

29. The information handling system of claim 20, wherein the management controller has firmware executing thereon that configures the rack-level management controller to: determine whether at least one of an infrastructure manager or the block controllers are to be reset;

in response to determining that at least one of the infrastructure manager or the block controllers are to be reset, generate a reset signal on a reset wire allocated within each Ethernet cable directly connecting the management controller with the infrastructure manager and the block controllers, wherein the reset signal triggers at least one of the of the infrastructure manager or the block controllers to reset.

* * * * *